United States Patent
Ma et al.

(10) Patent No.: US 12,520,108 B2
(45) Date of Patent: Jan. 6, 2026

(54) METHODS AND SYSTEMS FOR MULTICAST AND BROADCAST SERVICE ESTABLISHMENT IN WIRELESS COMMUNICATION NETWORKS

(71) Applicant: ZTE Corporation, Guangdong (CN)

(72) Inventors: Zijiang Ma, Guangdong (CN); Shuang Liang, Guangdong (CN); Zhendong Li, Guangdong (CN)

(73) Assignee: ZTE Corporation, Guangzhou (CN)

( * ) Notice: Subject to any disclaimer, the term of this patent is extended or adjusted under 35 U.S.C. 154(b) by 643 days.

(21) Appl. No.: 17/882,353

(22) Filed: Aug. 5, 2022

(65) Prior Publication Data

US 2022/0377508 A1    Nov. 24, 2022

Related U.S. Application Data

(63) Continuation of application No. PCT/CN2020/091036, filed on May 19, 2020.

(51) Int. Cl.
*H04W 4/06*  (2009.01)
*H04W 28/02* (2009.01)
*H04W 76/12* (2018.01)

(52) U.S. Cl.
CPC ......... *H04W 4/06* (2013.01); *H04W 28/0268* (2013.01); *H04W 76/12* (2018.02)

(58) Field of Classification Search
CPC .... H04W 4/06; H04W 76/12; H04W 28/0268
See application file for complete search history.

(56) References Cited

U.S. PATENT DOCUMENTS

| | | | |
|---|---|---|---|
| 2010/0322196 A1* | 12/2010 | Cherian | H04L 12/1877 370/332 |
| 2011/0154421 A1 | 6/2011 | Chun | |
| 2012/0263089 A1 | 10/2012 | Gupta et al. | |
| 2020/0374352 A1 | 11/2020 | Ge et al. | |
| 2021/0352444 A1* | 11/2021 | Griot | H04W 28/0268 |

FOREIGN PATENT DOCUMENTS

| | | |
|---|---|---|
| CN | 101090525 A | 12/2007 |
| CN | 101155053 A | 4/2008 |

(Continued)

OTHER PUBLICATIONS

3GPP; TR 23.757 v0.3.0; Jan. 2020; Study on architectural enhancements for 5G multicast-broadcast services (Year: 2020).*

(Continued)

*Primary Examiner* — Ricky Q Ngo
*Assistant Examiner* — Stephen N Steiner
(74) *Attorney, Agent, or Firm* — Perkins Coie LLP

(57) ABSTRACT

Methods and systems for establishing multicast and broadcast services are described. In one example aspect, the method includes adding, upon determination that flow establishment configuration information does not include a multicast broadcast service (MBS) flow identifier, a first identifier to the user data of the data traffic flow, and transmitting the data traffic flows with the first identifier through the unicast tunnel, or adding, upon determination that the flow establishment configuration information includes the multicast broadcast service (MBS) flow identifier and the corresponding multicast shared tunnel, a second identifier to the user data of the data traffic flows, and transmitting the data traffic flows with the second identifier through the multicast shared tunnel.

18 Claims, 11 Drawing Sheets

(56) References Cited

FOREIGN PATENT DOCUMENTS

| CN | 102379100 | A | 3/2012 |
|----|-----------|---|--------|
| CN | 104105070 | A | 10/2014 |
| CN | 109982266 |   | 7/2019 |
| CN | 110167190 | A | 8/2019 |
| WO | 2011099745 | A2 | 6/2011 |
| WO | 2014115989 | A1 | 7/2014 |

OTHER PUBLICATIONS

International Search Report and Written Opinion for International Application No. PCT/CN2020/091036, mailed on May 19, 2020 (8 pages).
Co-Pending Australian Application No. 2020395266, filed May 19, 2020, First Examination Report dated Mar. 17, 2023, 5 pages.
Co-Pending EP Application No. 20895049.3, Extended European Search Report dated Nov. 28, 2022, 11 pages.
3GPP "Technical Specification Group Core Network and Terminals; General Packet Radio System (GPRS) Tunnelling Protocol", 3GPP TS 29 .281 V11.6.0 (Mar. 2013) 27 pages.
3GPP "Technical Specification Group Services and System Aspects; Study on architectural enhancements for 5G multicast-broadcast services (Release 17)" 3GPP TR 23.757 V0.3.0 (Jan. 2020), 37 pages.
Huawei, et al. "Solution to K11 : Establishment of MBS session for multicast" SA WG2 Meeting #136 Reno, NV, USA, Nov. 18-22, 2019, S2-1911645, 3 pages.
ZTE "Solution for the Key issue#1 for the Architecture with BS-SC AF" SA WG2 Meeting #S2-136AH Jan. 13-17, 2020, Incheon, South Korea, 4 pages.
Co-Pending EP Application No. 20895049.3, Article 94 Communication dated Sep. 27, 2023, 6 pages.
CNIPA, First Office Action for Chinese Application No. 202080095027.7, mailed on Apr. 23, 2025, 23 pages with unofficial English translation.
Broadband Forum, "LS from the Broadband Forum: WT-134, Broadband Policy Control Framework (PCF)," 3GPP TSG SA #53, Fukuoka, Japan, SP-110450, Sep. 19-21, 2011, 158 pages.
Co-Pending EP Application No. 20895049.3, Decision to Refuse dated Mar. 11, 2025, 11 pages.
CNIPA, Second Office Action for Chinese Application No. 202080095027.7, mailed on Sep. 19, 2025, 6 pages with Google translation.

* cited by examiner

700

710 — Determine, by a first communication node, whether to set up one or more data traffic flows for a mobile device

720 — Transmit, upon determination to set up the one or more data traffic flows, to a second communication node, flow establishment configuration information including a unicast flow identifier and a corresponding unicast tunnel

730 — Add, upon determination that the flow establishment configuration information does not include a multicast broadcast service (MBS) flow identifier and a corresponding multicast shared tunnel, a first identifier to user data of the data traffic flow, and transmitting, by the first communication node, the data traffic flows with the first identifier to the second communication node through the corresponding unicast tunnel

740 — Add, upon determination that the flow establishment configuration information includes the multicast broadcast service (MBS) flow identifier and the corresponding multicast shared tunnel, a second identifier to the user data of the data traffic flows, and transmitting, by the first communication node, the data traffic flows with the second identifier to the second communication node through the corresponding multicast shared tunnel

FIG. 7

METHODS AND SYSTEMS FOR MULTICAST AND BROADCAST SERVICE ESTABLISHMENT IN WIRELESS COMMUNICATION NETWORKS

CROSS-REFERENCE TO RELATED APPLICATIONS

This application is a continuation of International Patent Application No. PCT/CN2020/091036, filed on May 19, 2020, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for establishing multicast and broadcast services.

In one aspect, a data communication method includes determining, by a first communication node, whether to set up one or more data traffic flows for a mobile device, transmitting, upon determination to set up the one or more data traffic flows, to a second communication node, flow establishment configuration information including a unicast flow identifier and a corresponding unicast tunnel, adding, upon determination that the flow establishment configuration information does not include a multicast broadcast service (MBS) flow identifier and a corresponding multicast shared tunnel, a first identifier to user data of the data traffic flow, and transmitting, by the first communication node, the data traffic flows with the first identifier to the second communication node through the corresponding unicast tunnel, and adding, upon determination that the flow establishment configuration information includes the multicast broadcast service (MBS) flow identifier and the corresponding multicast shared tunnel, a second identifier to the user data of the data traffic flows, and transmitting, by the first communication node, the data traffic flows with the second identifier to the second communication node through the corresponding multicast shared tunnel.

In another aspect, a data communication method includes receiving, by a second communication node, from a first communication node, flow establishment configuration information to transmit data traffic flows for a mobile device, determining, by the second communication node, whether to receive user data of the data traffic flows through a unicast tunnel or a multicast tunnel based on the flow establishment configuration information, and receiving, by the second communication node, the user data of the data traffic flows through the unicast tunnel or the multicast tunnel based on the determination.

In another aspect, a data communication method includes determining, by a core network, whether at least one multicast flow is established in an existing unicast protocol data unit session or a new unicast protocol data unit session, and using, by the core network, for data communication, an existing unicast tunnel corresponding to the existing unicast protocol data unit session or a new unicast tunnel corresponding to the new unicast protocol data unit session based on the determination.

These, and other, aspects are described in the present document.

BRIEF DESCRIPTION OF DRAWINGS

FIG. 7 depicts an example of a process for wireless communication based on some example embodiments of the disclosed technology.

DETAILED DESCRIPTION

Certain features are described using the example of Fifth Generation (5G) wireless protocol. However, applicability of the disclosed techniques is not limited to only 5G wireless systems.

5G systems (5GS) include multicast/broadcast services. An aspect of these services is multi-cast discovery and the starting and ending of multicast services. User equipment (UEs) may simultaneously operate using unicast (also referred to as unicast) and multicast services. When a UE moves from one radio access network (RAN) node to another RAN node, service continuity of the broadcast and multicast services is needed. Disclosed herein are techniques for providing continuity of service for broadcast and multicast services.

In some example embodiments, a multicast service is a communications service in which the same service and the same content data are provided simultaneously to a set of authorized UEs (i.e., not all UEs in the multicast coverage are authorized to receive the data). A broadcast service is a communications service in which the same service and the same content data are provided simultaneously to all UEs in a geographical area (i.e., all UEs in the broadcast coverage area are authorized to receive the data).

Figure 1:
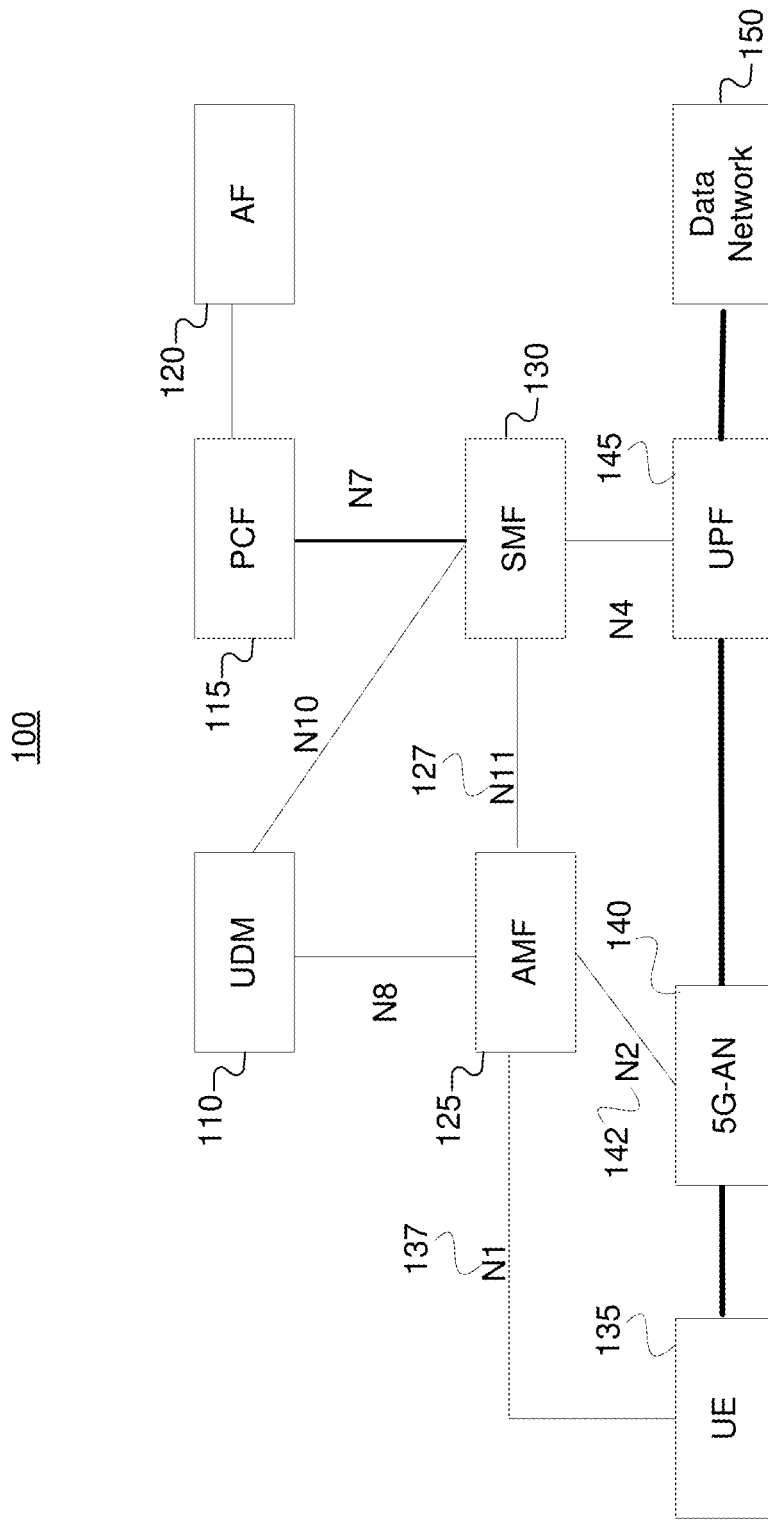
FIG. 1 depicts an architecture for a 5G system based on some example embodiments of the disclosed technology.

FIG. 1 depicts an example architecture 100 for a 5G system. The 5G System architecture consists of the network functions (NF) as well as other functions described below.

The access and mobility management function (AMF) 125 performs functions including UE mobility management, reachability management, connection management, and other functions. The AMF terminates the radio access network control plane (RAN CP) interface (also referred to as N2 interface 142) and non-access stratum (NAS) (also referred to as N1 interface 137), NAS ciphering and integrity protection. The AMF also distributes the session management (SM) NAS to the proper session management functions (SMFs) via the N11 interface 127.

The session management function (SMF) 130 includes user equipment (UE) internet protocol (IP) address allocation and management, selection and control of an UP function, PDU connection management, etc.

The user plane function (UPF) 145 is an anchor point for intra-/inter-radio access technology (RAT) mobility and the external protocol data unit (PDU) session point of interconnect to a data network. The UPF also routes and forwards data packets as indicated by the SMF, and the UPF buffers the downlink (DL) data when the UE is in idle mode.

The unified data management (UDM) 110 manages the subscription profiles for the UEs. The subscription includes the data used for mobility management (e.g., restricted area), session management (e.g., quality of service (QoS) profile per slice per data network name (DNN)). The subscription data also includes slice selection parameters which are used by the AMF to select an SMF. The AMF and SMF get the subscription from the UDM and the subscription data is stored in the unified data repository (UDR). The UDM uses the data upon receipt of a request from the AMF or SMF.

The policy control function (PCF) 115 governs network behavior based on the subscription and indication from the application function (AF) 120. The PCF provides policy rules to be enforced by the control plane (CP) functions such as the AMF and/or SMF. The PCF accesses the UDR to retrieve policy data.

A network exposure function (NEF) (not shown) may be included in the system for exchanging information between a core network (5GC) and an external third party. For example, the AF 120 may store the application information in the UDR via the NEF.

Multicast broadcast multimedia service (MBMS) was developed for video broadcasting and streaming services. Since its initial development, the MBMS system has been updated to support new services such as public safety, consumer internet of things (CIoT) and vehicle to everything (V2X). With the development and maturity of 5GS, 5GS is may provide multicast-broadcast services for vertical businesses.

Figure 2:
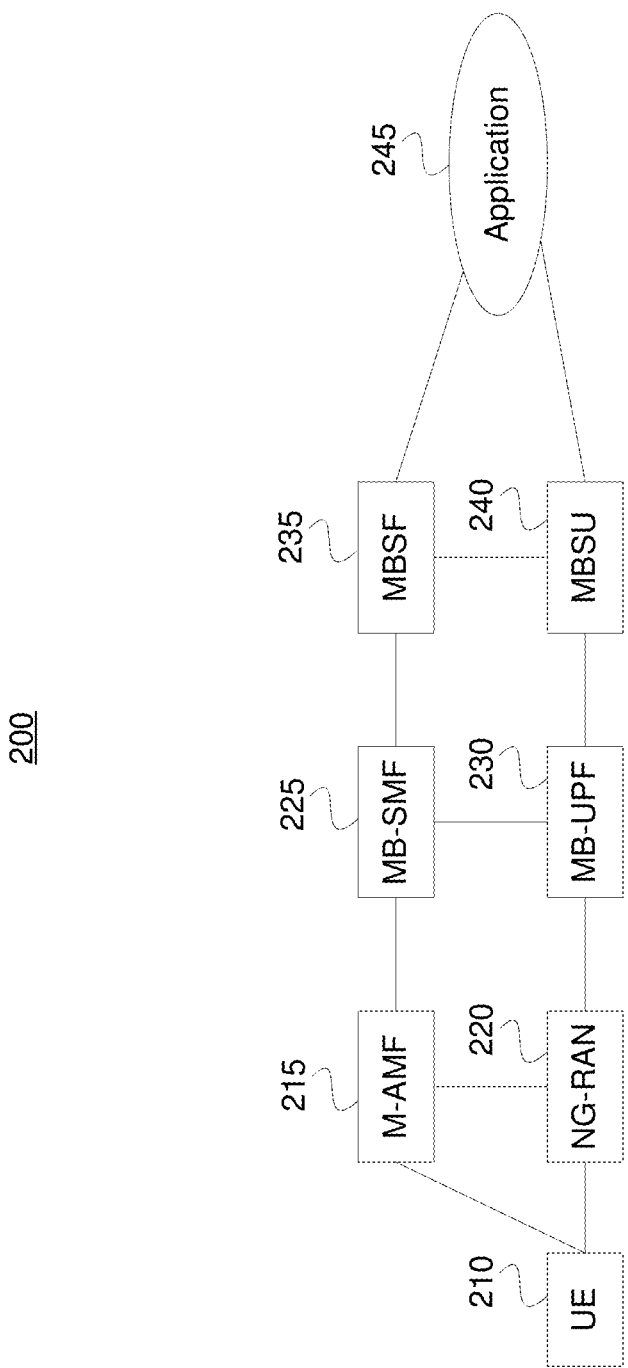
FIG. 2 depicts an enhanced 5G system architecture to provide broadcast/multicast services to a user equipment based on some example embodiments of the disclosed technology.

FIG. 2 depicts an example of an enhanced 5G system architecture 200 to provide broadcast/multicast services to a user equipment 230.

The multicast/broadcast service function (MBSF) 235 is a network function (NF) to handle a signaling part of a service layer capability and provides an interface to application server 245. It may be a standalone entity or collocated with an MB-SMF.

The multicast/broadcast service user plane (MBSU) 240 handles a payload part of the service layer capability and may be a standalone entity or collocated with the MBSF or MB-UPF.

The SMF and UPF may be enhanced to support the multicast/broadcast service. The AMF may also be enhanced to make transparent the signaling for multicast/broadcast service between the RAN/UE and multicast/broadcast-SMF (MB-SMF) 225.

Figure 3:
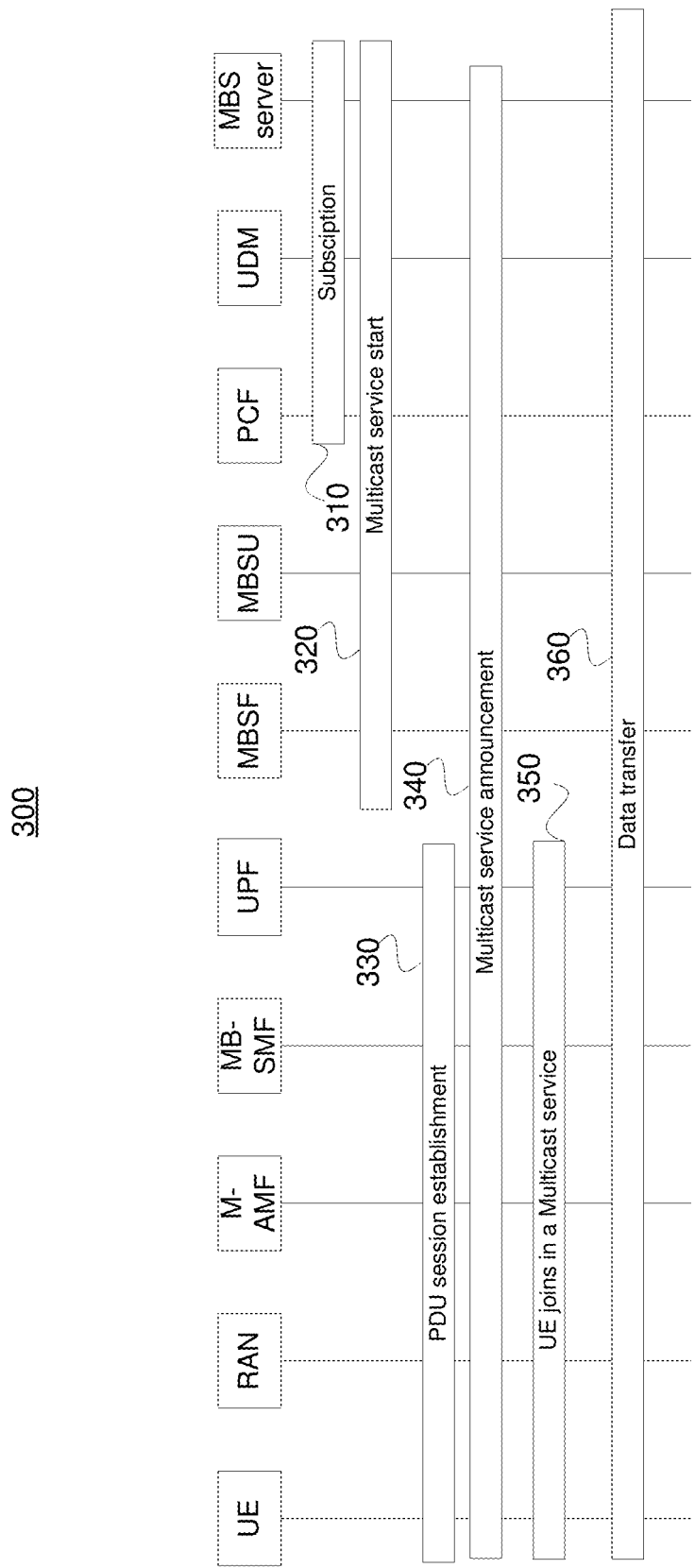
FIG. 3 depicts phases in a process for providing a multicast service based on some example embodiments of the disclosed technology.

FIG. 3 depicts examples of phases in a process for providing a multicast service.

At a service subscription phase 310, a subscription is the agreement of a user to receive service(s) offered by an operator. The relationship between the user and the service provider is established during the subscription. A relationship may be stored in the unified data repository (UDR) statically or pushed dynamically from the MBS server to the related PCF.

At a multicast service start phase 320, the MBS server triggers the MBSF to start the session to send multicast data. The MBSF triggers an MBS session establishment in 5GS. Session start occurs independently of activation of the service by the user (i.e., a given user may activate the service before or after session start). Session start is the trigger for bearer resource establishment for MBMS data transfer.

At a PDU session establishment phase 330, the UE may initiate a unicast PDU session establishment to retrieve a multicast service configuration or setup an association with the MBSF. This may occur before phase 310. The UE may subscribe to a multicast service dynamically via an established PDU session. This phase may also occur after phase 340 in a case where the multicast service starts before a UE joins the multicast service.

At a multicast service announcement phase 340, the multicast service announcement/discovery mechanisms allow users to request or to be informed of the range of available multicast services. The announcement is also used to distribute information to users about the services parameters required for service activation (e.g., IP multicast address(es)) and possibly other service-related parameters (e.g., service start time).

At a multicast joining phase 350, the UE initiates the joining process in order to become a member of a multicast group.

At data transfer phase 360, data is transferred to the UE.

Figure 4:
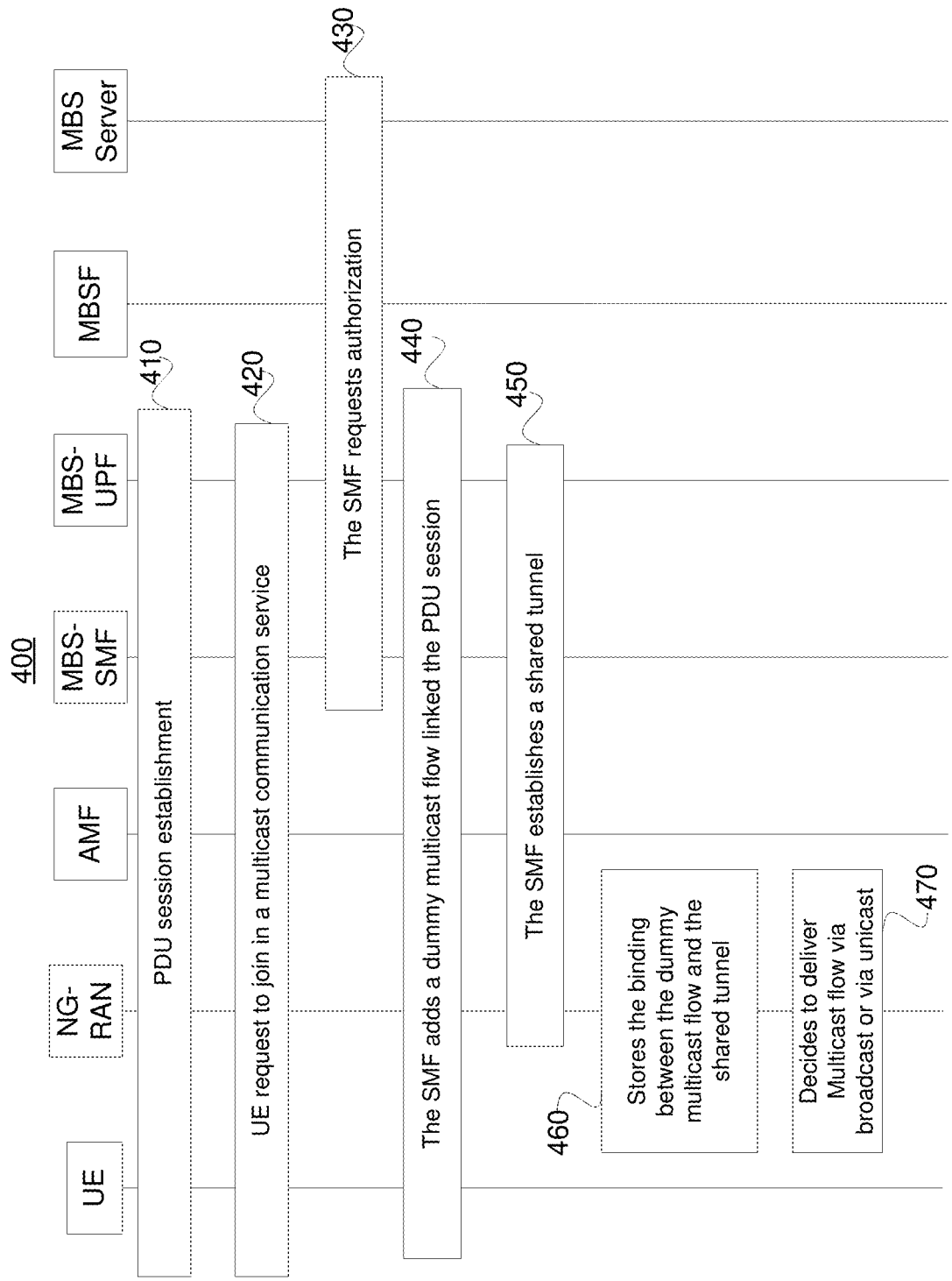
FIG. 4 depicts a process for establishing a shared tunnel to transfer a multicast service in a 5G system based on some example embodiments of the disclosed technology.

FIG. 4 depicts an example of a process for establishing a shared tunnel to transfer a multicast service in a 5G system. In some example embodiments, the process occurs after the UE has established a PDU session.

At 410, the UE initiates a unicast PDU session establishment process. During the process, an MBS-SMF supporting unicast and multicast is selected based on a specific DNN and single network slice selection assistance information (S-NSSAI). Upon completion of the establishment process, the UE may retrieve a multicast service configuration.

At 420, the UE initiates a joining request via UP data or NAS message to join a multicast communication service.

At 430, when the request is detected by the MB-SMF, the MB-SMF requests the MBSF to authorize the UE. The MBSF checks whether the UE is allowed to access the service. If it is, the MBSF checks whether a multicast context for the multicast group exists (i.e., whether a UE has already joined the multicast group). If the multicast context for the multicast group does not exist, then the SMF creates it when the first UE joins the multicast group. The check may involve the MBS server, PCF, and/or UDM. The MBS server may store the group membership in the UDM or send it to the PCF before the 430. Then the MBSF or MB-SMF may retrieve the information during the association establishment between the MBSF/MB-SMF and the PCF/UDM. If there is no interaction between the MBSF and the PCF/UDM, the MBSF may retrieve the information from the MB-SMF.

Figure 5:
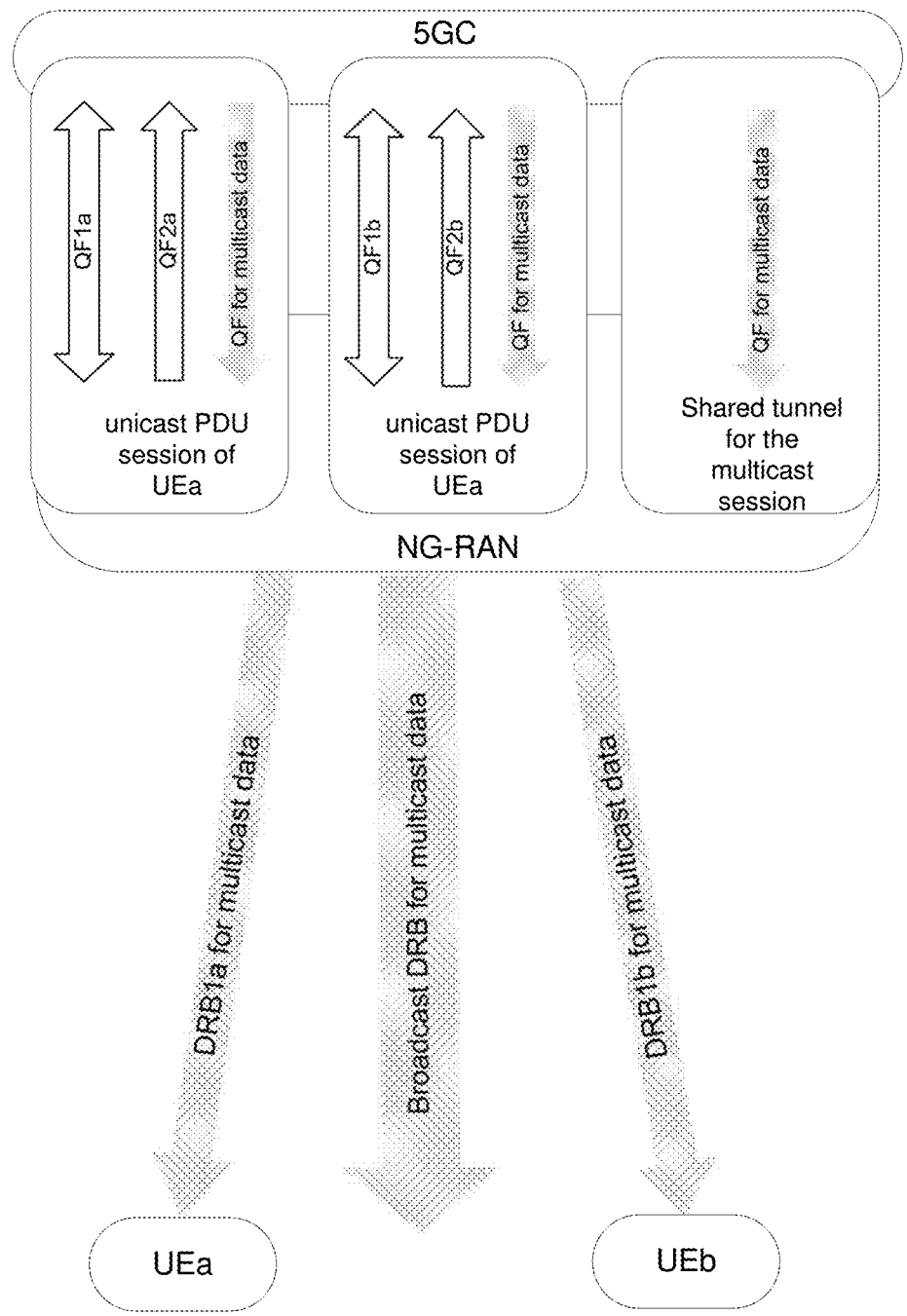
FIG. 5 depicts a process for transferring the multicast service data by a core network (CN) to a radio access network (NG-RAN) based on some example embodiments of the disclosed technology.

FIG. 5 depicts a process for transferring the multicast service data by a core network (e.g., 5GC) to a radio access network (NG-RAN) based on some example embodiments of the disclosed technology.

After a user device (e.g., UE) has successfully joined one or more multicast broadcast multimedia service (MBMS) quality-of-service (QoS) flows (MBMS QoS flows) for a MBMS service, the core network (e.g., 5GC) may trigger a flow establishment procedure to establish one or more MBMS QoS flows for that user device (e.g., UE).

In the context of this patent document, the word "multicast broadcast multimedia service (MBMS)" can be used to indicate "multicast broadcast service (MBS)," and both terms can be used interchangeably.

In some embodiments of the disclosed technology, a multicast/broadcast service function (MBSF) can initiate a flow establishment procedure for a multicast flow. For each user device that has joined the one or more one or more multicast broadcast multimedia services (MBMS), the MBSF triggers a multicast/broadcast session management function (MB-SMF) to establish one or more MBMS QoS flows (i.e., multicast QoS flows) in an existing protocol data unit (PDU) session by a core-network-initiated PDU session modification procedure (e.g., a procedure for modifying PDU session that is initiated by 5GC), or in a new PDU session by a core-network-initiated PDU session setup procedure. These MBMS QoS flows are binding with a unicast tunnel associated with a user device (UE). For example, the user data in these QoS flows may be transmitted from a core network (e.g., 5GC) to a user device (e.g., UE) through the unicast tunnel.

In a case where multiple user devices (UEs) have joined (the same) one or more MBMS QoS flows, the core network (e.g., 5GC) may establish a user-device-associated unicast tunnel to transfer the one or more MBMS QoS flows for each user device (e.g., UE).

In some embodiments of the disclosed technology, when transmitting user data of the one or more MBMS QoS flows in a multicast mode (through a shared/multicast tunnel), the MBSF also triggers the MB-SMF to establish a shared tunnel for all the user devices (UEs) joining (the same) one or more MBMS QoS flows under the same radio access network (NG-RAN) node. The one or more MBMS QoS flows discussed above will be established in a shared tunnel (i.e., MBMS associated multicast tunnel). When the one or more MBMS QoS flows are configured with a share tunnel, MBMS identifiers (e.g., TMGI, session ID, special QoS flow ID) different from the unicast QoS flow are also configured.

In some implementations, when the use data of the one or more MBMS QoS flows are transmitted in a multicast mode via a shared tunnel, the one or more QoS flows may be configured with both the MBMS identifiers and the shared tunnel.

In some implementations, when the use data of the one or more MBMS QoS flows are transmitted in a unicast mode via a unicast tunnel (configured as discussed above), the one or more QoS flows may not be configured with the MBMS identifiers.

In some embodiments of the disclosed technology, the one or more MBMS QoS flows bind both unicast tunnel and multicast tunnel for each user device that has joined the one or more multicast broadcast multimedia services (MBMS). When the one or more MBMS QoS flows are established, the one or more MBMS QoS flows bind a user-device-associated unicast tunnel, and may bind an MBMS-associated multicast shared tunnel. If only the user-device-associated unicast tunnel is available, the user data of the one or more MBMS QoS flows will be transmitted through the user-device-associated unicast tunnel. If both the user-device-associated unicast tunnel and the multicast shared tunnel are available, the user data of the one or more MBMS QoS flows may be transmitted through the shared tunnel, not through the unicast tunnel. In this case, the unicast tunnel may be referred to as "dummy tunnel" (i.e., no user data is transmitted through this tunnel).

In some embodiments of the disclosed technology, for one or more MBMS QoS flows belonging to a certain MBMS service, if user data of the one or more MBMS QoS flows is transmitted in a unicast mode through a unicast tunnel, the QFI (QoS flow identifier) may be added to an encapsulation header of each user data packet. If the user data is transmitted in a multicast mode through a shared channel, the MBMS identifier may be added to an encapsulation header of each user data packet.

In some embodiments of the disclosed technology, for one or more MBMS QoS flows belonging to a certain MBMS service, their corresponding unicast tunnels (used to transmit user data of MBMS QoS flow in a unicast mode) and QFI (QoS flow identifier) are always configured. Only in a multicast mode, MBMS identifier and a shared tunnel (used to transmit user data of MBMS QoS flow in a multicast mode) may be configured.

When a core network (e.g., 5GC) transmits user data of the MBMS QoS flow in a unicast mode, the core network 5GC will not configure the MBMS identifier and the shared tunnel. If the core network 5GC switches from the unicast mode to a multicast mode and transmits user data of the MBMS QoS flow in the multicast mode, the core network 5GC additionally configures the MBMS identifier and the shared tunnel for the one or more MBMS QoS flows. By contrast, if the MBMS identifier and the shared tunnel is removed from the MBMS QoS flow configuration, then the user data of the MBMS QoS is transmitted in the unicast mode.

Figure 6:
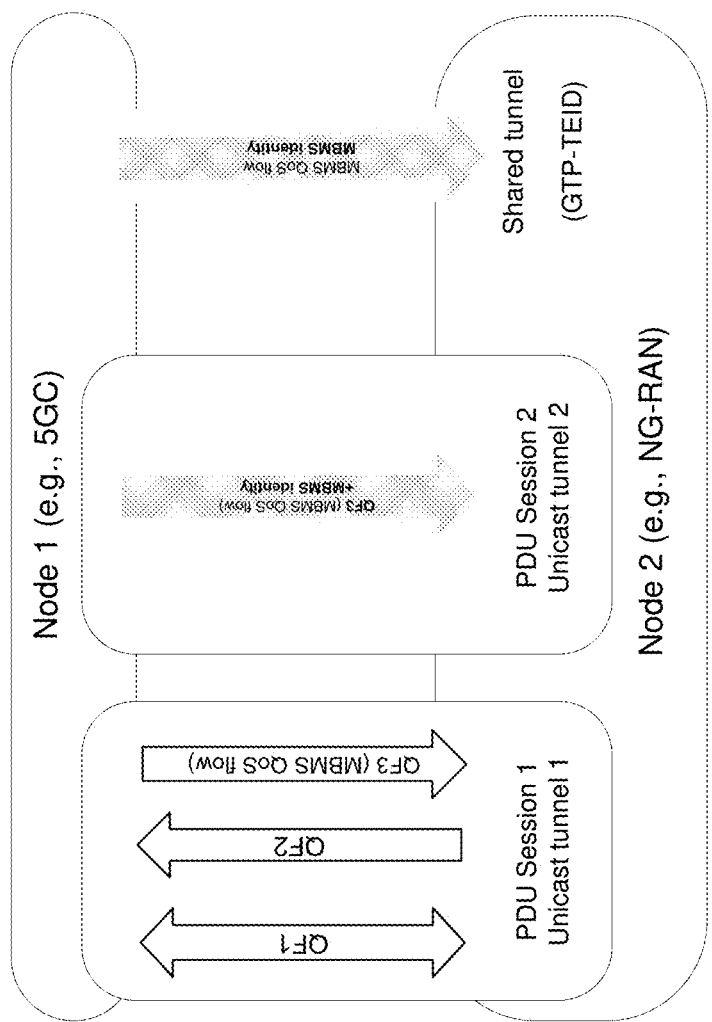
FIG. 6 depicts unicast and shared tunnels established between a first communication node and a second communication node based on some example embodiments of the disclosed technology.

FIG. 6 depicts unicast and shared tunnels established between a first communication node and a second communication node based on some example embodiments of the disclosed technology.

A first user device UEa has established a unicast PDU session including one or more unicast QoS flows, e.g., a first QoS flow identifier QF1, a second QoS flow identifier QF2, are established in a first unicast PDU session (e.g., PDU session 1) and including a first unicast tunnel used to transmit user data of the first and second QoS flow identifiers QF1 and QF2.

After the first user device UEa has successfully joined an MBMS service, the core network (e.g., 5GC) triggers a flow establishment procedure to establish one or more MBMS QoS flows. Here, the one or more MBMS QoS flows are mapped to the MBMS service. In this example, a third QoS flow identifier QF3 different from the first and second QoS flow identifiers QF1 and QF2 is assigned to the one or more MBMS QoS flows.

If the one or more MBMS QoS flows are established in the existing unicast PDU session (e.g., PDU session 1), the identifiers of the one or more MBMS QoS flows are different from the first and second QoS flow identifiers QF1 and QF2. The one or more MBMS QoS flows have the same unicast tunnel as the other the first and second QoS flow identifiers QF1 and QF2. The existing unicast PDU session has already been configured in a unicast tunnel (e.g., unicast tunnel 1) and the unicast tunnel can be used for all of its QoS flows. In other words, the one or more MBMS QoS flows can use the existing unicast tunnel for unicast transmission.

If the one or more MBMS QoS flows are established in a new unicast PDU session (e.g., PDU session 2), the identifier of the new PDU session is different from the existing PDU session. The new unicast PDU session is also configured with a new unicast tunnel (e.g., unicast tunnel 2), and the one or more MBMS QoS flows can use the new unicast tunnel for unicast transmission.

If the core network (5GC) transmits the one or more MBMS QoS flows belonging to a certain MBMS service in a multicast mode, the core network may additionally configure a shared (multicast) tunnel for the one or more MBMS QoS flows. The one or more MBMS QoS flows are configured with two tunnels (one is unicast tunnel and the other is multicast tunnel), and the core network (5GC) sends user data of the one or more MBMS QoS flows through the multicast tunnel to a radio access network (NG-RAN). In this case, no user data of the one or more MBMS QoS flows is transmitted through the unicast tunnel, and thus the unicast tunnel in this case can be referred to as "dummy tunnel." Here, the one or more MBMS QoS flows may also be configured with one or more MBMS identifiers (e.g., MBMS TMGI, TMGI, MBMS session ID, session ID, special QF ID), indicating that the user data of the one or more MBMS QoS flows may be transmitted in a multicast mode via a shared/multicast tunnel.

In a situation where the radio access network (NG-RAN) node is authorized to establish one or more MBMS QoS flows belonging to a certain MBMS service, if the one or more MBMS QoS flows do not configure the one or more MBMS identifiers and/or do not configure a corresponding shared/multicast tunnel, the radio access network (NG-RAN) receives the user data of the one or more MBMS QoS flows through the unicast tunnel. If the one or more MBMS QoS flows configure the one or more MBMS identifiers and a corresponding shared/multicast tunnel, the radio access network (NG-RAN) receives the user data of the one or more MBMS QoS flows through the shared/multicast tunnel.

When the radio access network (NG-RAN) node receives the multicast data through the shared/multicast tunnel, the radio access network (NG-RAN) can decide to deliver a multicast flow in a PTM mode (point to multiple point) or a PTP mode (point to point) on the radio interface. If the unicast mode is used, the MBMS QoS flow within the unicast PDU session is used to transfer the multicast (MBMS) QoS flow via a dedicated data radio bearer (DRB) on the radio interface. If the broadcast mode is used, the UEs in the same group of such multicast service receives the multicast data via a shared data radio bearer (DRB) on the radio interface.

In some embodiments of the disclosed technology, one or more user devices UEs successfully join a MBMS service in a given area (e.g. within a NG-RAN). When the core network 5GC decides to send user data of one or more MBMS QoS flows through a shared tunnel for the one or more user device that have joined the MBMS service, the core network 5GC may, for each user device UE, separately configure a shared tunnel and MBMS identifier for the one or more MBMS QoS flows.

In a situation where the radio access network (NG-RAN) receives MBMS QoS flow configuration information, if the radio access network (NG-RAN) establishes the one or more MBMS QoS flows, the radio access network (NG-RAN) may receive user data of the one or more MBMS QoS flows through the shared tunnel, and the radio access network (NG-RAN) decides whether to deliver multicast flow via the PTM mode or the PTP mode on the radio interface.

FIG. 7 depicts an example of a process 700 for wireless communication based on some example embodiments of the disclosed technology. At 710, the method 700 includes determining, by a first communication node (e.g., 5GC), whether to set up one or more data traffic flows for a mobile device. At 720, the method includes transmitting, upon determination to set up the one or more data traffic flows, to a second communication node (e.g., NG-RAN), flow establishment configuration information (e.g., MBS QoS flow configuration information) including a unicast flow identifier (e.g., QFI), a corresponding unicast tunnel and a corresponding quality of service (QoS) profile. At 730, the method includes adding, upon determination that the flow establishment configuration information does not further include a multicast broadcast service (MBS) flow identifier, a corresponding multicast shared tunnel and a corresponding multicast quality of service (QoS) profile, a first identifier to user data of the data traffic flow, and transmitting, by the first communication node, the data traffic flows with the first identifier to the second communication node through the corresponding unicast tunnel. At 740, the method includes upon determination that the flow establishment configuration information further includes the multicast broadcast service (MBS) flow identifier, the corresponding multicast shared tunnel and the corresponding multicast quality of service (QoS) profile, a second identifier to the user data of the data traffic flows, and transmitting, by the first communication node, the data traffic flows with the second identifier to the second communication node through the corresponding multicast shared tunnel.

Figure 8:
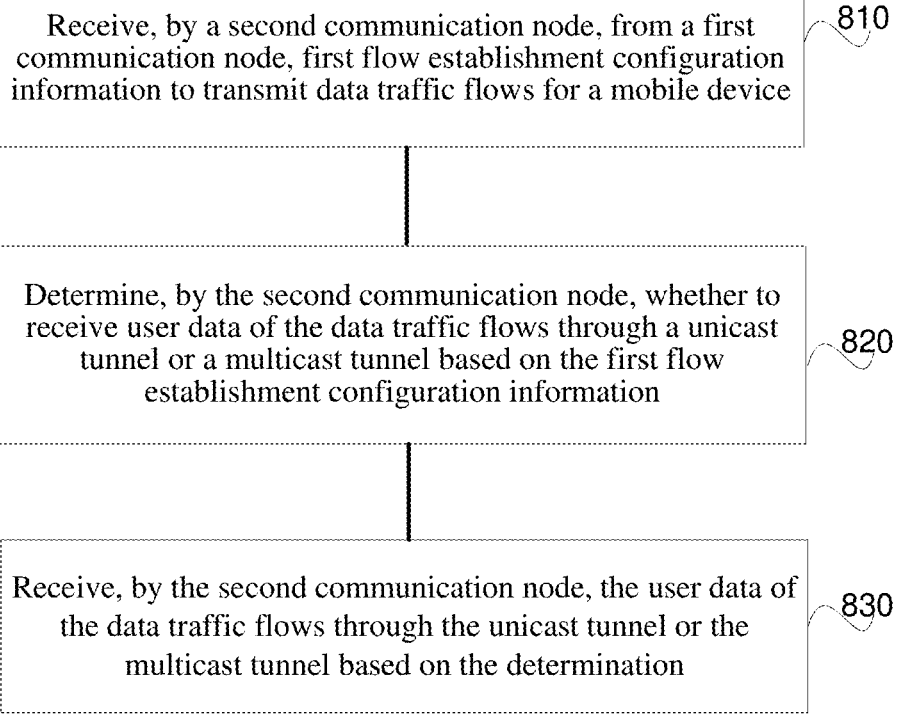
FIG. 8 depicts another example of a process for wireless communication based on some example embodiments of the disclosed technology.

FIG. 8 shows another example of a process 800 for wireless communication based on some example embodiments of the disclosed technology. At 810, the method 800 includes receiving, by a second communication node (e.g., NG-RAN), from a first communication node (e.g., 5GC), flow establishment configuration information (e.g., MBS QoS flow configuration information) to transmit data traffic flows for a mobile device. At 820, the method includes determining, by the second communication node, whether to receive user data of the data traffic flows through a unicast tunnel or a multicast tunnel based on the flow establishment configuration information. At 830, the method includes receiving, by the second communication node, the user data of the data traffic flows through the unicast tunnel or the multicast tunnel based on the determination.

Figure 9:
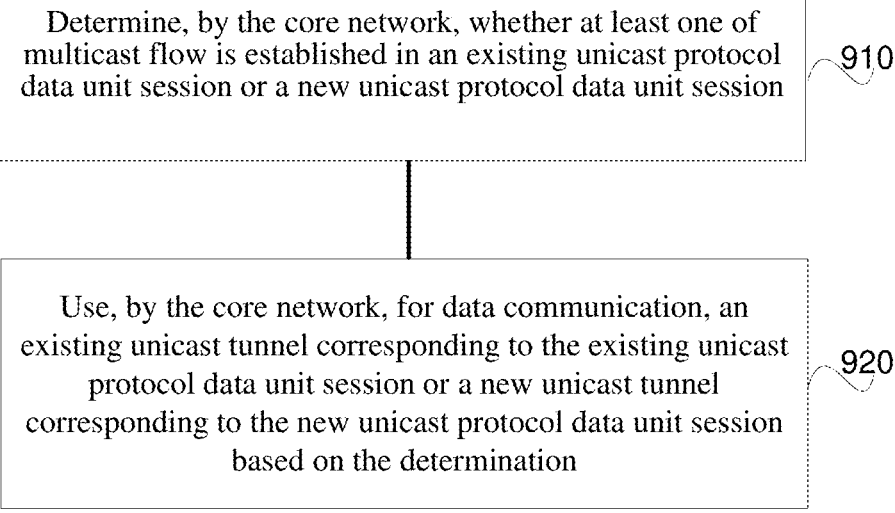
FIG. 9 depicts another example of a process for wireless communication based on some example embodiments of the disclosed technology.

FIG. 9 shows another example of a process 900 for wireless communication based on some example embodiments of the disclosed technology. At 910, the method determining, by a core network, whether at least one of multicast flow is established in an existing unicast protocol data unit session or a new unicast protocol data unit session. At 920, the method includes using, by the core network, for data communication, an existing unicast tunnel corresponding to the existing unicast protocol data unit session or a new unicast tunnel corresponding to the new unicast protocol data unit session based on the determination.

Figure 10:
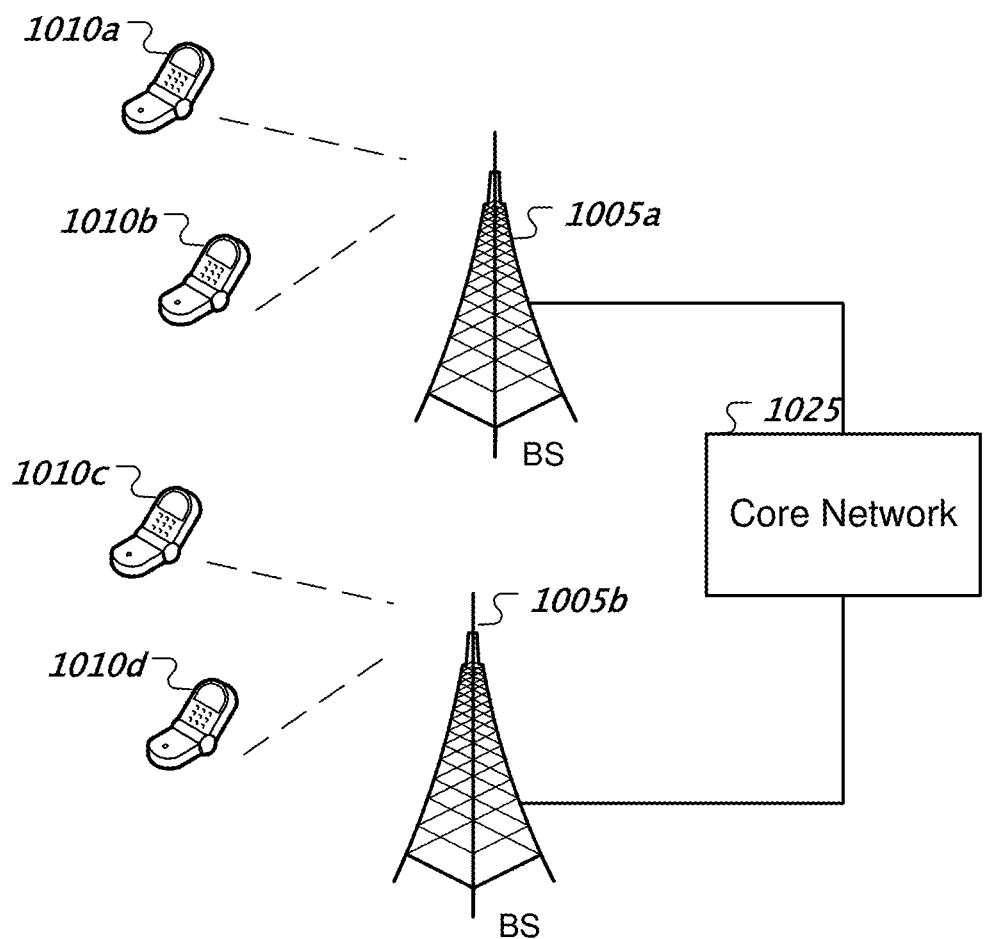
FIG. 10 depicts a wireless communication system based on some example embodiments of the disclosed technology.

FIG. 10 shows an example of a wireless communication system 1000 where techniques in accordance with one or more embodiments of the present technology can be applied. A wireless communication system 1000 can include one or more base stations (BSs) 1005a, 1005b, one or more wireless devices 1010a, 1010b, 1010c, 1010d, and a core network 1025. A base station 1005a, 1005b can provide wireless service to wireless devices 1010a, 1010b, 1010c and 1010d in one or more wireless sectors. In some implementations, a base station 1005a, 1005b includes directional antennas to produce two or more directional beams to provide wireless coverage in different sectors.

The core network 1025 can communicate with one or more base stations 1005a, 1005b. The core network 1025 provides connectivity with other wireless communication systems and wired communication systems. The core network may include one or more service subscription databases to store information related to the subscribed wireless devices 1010a, 1010b, 1010c, and 1010d. A first base station 1005a can provide wireless service based on a first radio access technology, whereas a second base station 1005b can provide wireless service based on a second radio access technology. The base stations 1005a and 1005b may be co-located or may be separately installed in the field according to the deployment scenario. The wireless devices 1010a, 1010b, 1010c, and 1010d can support multiple different radio access technologies. The techniques and embodiments described in the present document may be implemented by the base stations of wireless devices described in the present document.

Figure 11:
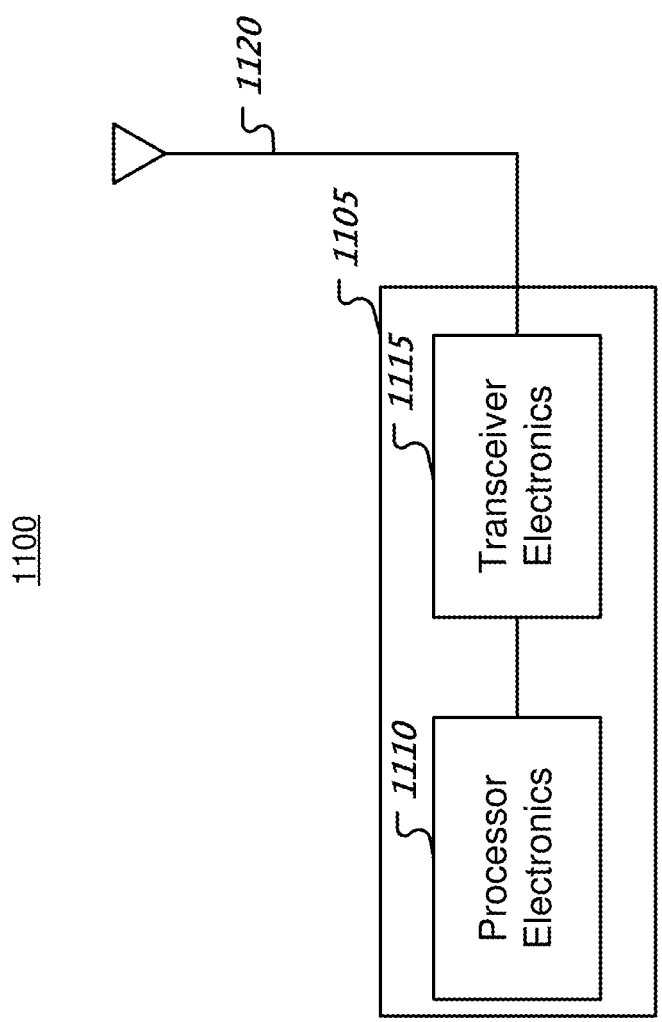
FIG. 11 depicts a block diagram of a portion of a radio system based on some example embodiments of the disclosed technology.

FIG. 11 is a block diagram representation of a portion of a radio station in accordance with one or more embodiments of the present technology can be applied. A radio 1105 such as a base station or a wireless device (or UE) can include processor electronics 1110 such as a microprocessor that implements one or more of the wireless techniques presented in this document. The radio 1105 can include transceiver electronics 1115 to send and/or receive wireless signals over one or more communication interfaces such as antenna 1120. The radio 1105 can include other communication interfaces for transmitting and receiving data. Radio 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the radio 1105. In some embodiments, the radio 1105 may be configured to perform the methods described in this document.

It will be appreciated that the present document discloses techniques that can be embodied in various embodiments to establish and manage multicast sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

Clause 1. A data communication method, comprising: determining, by a first communication node, whether to set up one or more data traffic flows for a mobile device; transmitting, upon determination to set up the one or more data traffic flows, to a second communication node, flow establishment configuration information including a unicast flow identifier and a corresponding unicast tunnel; and adding, upon determination that the flow establishment configuration information does not include a multicast broadcast service (MBS) flow identifier and a corresponding multicast shared tunnel, a first identifier to user data of the data traffic flow, and transmitting, by the first communication node, the data traffic flows with the first identifier to the second communication node through the corresponding unicast tunnel; or adding, upon determination that the flow establishment configuration information includes the multicast broadcast service (MBS) flow identifier and the corresponding multicast shared tunnel, a second identifier to the user data of the data traffic flows, and transmitting, by the first communication node, the data traffic flows with the second identifier to the second communication node through the corresponding multicast shared tunnel.

Clause 2. The method of clause 1, wherein the corresponding unicast tunnel includes an existing unicast tunnel or a new unicast tunnel.

Clause 3. The method of clause 1, wherein the flow establishment configuration information is included in an existing protocol data unit (PDU) session.

Clause 4. The method of clause 3, wherein the corresponding unicast tunnel is an existing unicast tunnel being used by the existing PDU session.

Clause 5. The method of clause 3, wherein the corresponding unicast tunnel is a new unicast tunnel being used by the new PDU session.

Clause 6. The method of clause 1, wherein the flow establishment configuration information is included in a new protocol data unit (PDU) session.

Clause 7. The method of clause 1, wherein the data traffic flow is a multicast flow, and the user data of the data traffic flow is multicast broadcast service (MBS) user data.

Clause 8. The method of clause 1, wherein the first identifier includes quality of service (QoS) flow identity (QFI).

Clause 9. The method of clause 1, wherein the second identifier includes a multicast broadcast service (MBS) identity.

Clause 10. The method of clause 9, wherein the MBS identity includes at least one of multicast broadcast service (MBS) group identifier, or multicast broadcast multimedia service (MBMS) service identifier, MBMS session identifier, multicast broadcast service quality-of-service flow identifier (MBS QFI), or temporary mobile group identity (TMGI).

Clause 11. The method of clause 1, wherein each of the first and second identifiers is added to an encapsulation header of each data packet of the data traffic flow.

Clause 12. The method of clause 1, wherein the shared tunnel is established by a multicast broadcast session triggered by a multicast broadcast service function (MBSF).

Clause 13. A data communication method, comprising: receiving, by a second communication node, from a first communication node, flow establishment configuration information to transmit data traffic flows for a mobile device; determining, by the second communication node, whether to receive user data of the data traffic flows through a unicast tunnel or a multicast tunnel based on the flow establishment configuration information; and receiving, by the second communication node, the user data of the data traffic flows through the unicast tunnel or the multicast tunnel based on the determination.

Clause 14. The method of clause 13, wherein the flow establishment configuration information is included in an existing protocol data unit (PDU) session.

Clause 15. The method of clause 14, wherein the unicast tunnel is an existing unicast tunnel being used by the existing PDU session.

Clause 16. The method of clause 13, wherein the flow establishment configuration information is included in a new protocol data unit (PDU) session.

Clause 17. The method of clause 16, wherein the unicast tunnel is a new unicast tunnel being used by the new PDU session.

Clause 18. The method of clause 13, wherein the first communication node is configured to determine which transmission mode is to be used between a unicast mode and a multicast mode.

Clause 19. The method of clause 18, wherein the unicast mode is configured to use the unicast tunnel, and the multicast mode is configured to use the multicast tunnel.

Clause 20. The method of any of clauses 18-19, wherein, upon determination that the flow establishment configuration information indicates that both the multicast tunnel and unicast tunnel are configured, the multicast mode is used.

Clause 21. The method of any of clauses 18-19, wherein, upon determination that the flow establishment configuration information indicates that the unicast tunnel is configured but the multicast tunnel is not configured, the unicast mode is used.

Clause 22. The method of any of clauses 1-21, wherein the first communication node includes a core network, and the second communication node includes a radio access network.

Clause 23. A data communication method, comprising: determining, by a core network, whether at least one of multicast flow is established in an existing unicast protocol data unit session or a new unicast protocol data unit session; and using, by the core network, for data communication, an existing unicast tunnel corresponding to the existing unicast protocol data unit session or a new unicast tunnel corresponding to the new unicast protocol data unit session based on the determination.

Clause 24. The method of clause 23, further comprising establishing, by the core network, at least one of a unicast flow or a multicast flow between the core network and a radio access network.

Clause 25. The method of clause 24, wherein the establishing of the at least one of unicast flow or multicast flow includes establishing, by the core network, the multicast flow in the existing protocol data unit session including a first unicast tunnel configured to carry data traffic between the core network and each mobile device.

Clause 26. The method of clause 25, wherein an identifier for the multicast flow is different from an identifier for the unicast flow established in the same existing protocol data unit session.

Clause 27. The method of clause 25, wherein the multicast flow is carried by the first unicast tunnel.

Clause 28. The method of clause 24, wherein the establishing of the at least one of unicast flow or multicast flow includes establishing, by the core network, the multicast flow in the new protocol data unit session including a second unicast tunnel configured to carry data traffic between the core network and each mobile device.

Clause 29. The method of clause 28, wherein an identifier for the new protocol data unit session is different from an identifier for the existing protocol data unit session.

Clause 30. The method of clause 28, wherein the multicast flow is carried by the second unicast tunnel.

Clause 31. The method of clause 24, wherein the establishing of the at least one of unicast flow or multicast flow includes establishing, by the core network, the multicast flow in a shared tunnel configured to carry data traffic between the core network and a plurality of mobile devices.

Clause 32. The method of clause 31, further comprising transmitting user data of the multicast flow to the radio access network through the shared tunnel.

Clause 33. The method of clause 32, further comprising, upon determination that the radio access network is authorized to establish the multicast flow without receiving any identifier for the multicast flow, transmitting user data of the multicast flow to the radio access network through the first or second unicast tunnels.

Clause 34. The method of clause 23, wherein the multicast flow is configured with at least one of multicast broadcast multimedia services (MBMS) temporary mobile group identity (TMGI), Mpirical TMGI, TMGI, MBMS session ID, session ID, or QoS Flow ID (QFI).

Clause 35. The method of clause 24, wherein the radio access network is configured to use a broadcast data radio bearer to transmit the multicast flow on a radio interface, when the flow is transmitted on a point-to-multiple-point basis.

Clause 36. The method of clause 24, wherein the radio access network is configured to use a dedicated data radio bearer to transmit the multicast flow on a radio interface, when the flow is transmitted on a point-to-point basis.

Clause 37. An apparatus for wireless communication, comprising a memory and a processor, wherein the processor reads code from the memory and implements a method recited in any of clauses 1 to 36.

Clause 38. A computer readable program storage medium having code stored thereon, the code, when executed by a processor, causing the processor to implement a method recited in any of clauses 1 to 36.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A data communication method, comprising:
   determining, by a first communication node, whether to set up one or more data traffic flows for a mobile device;
   transmitting, upon determination to set up the one or more data traffic flows, to a second communication node, flow establishment configuration information including a unicast flow identifier, a corresponding unicast tunnel, and a corresponding quality of service (QOS) profile, wherein the unicast flow identifier includes a quality of service (QOS) flow identifier; and
   upon determination that the flow establishment configuration information does not include a multicast broadcast service (MBS) flow identifier, a corresponding multicast shared tunnel, and a corresponding multicast quality of service (QOS) profile, adding the QoS flow identifier to an encapsulation header of user data of the data traffic flow, and transmitting, by the first communication node, the user data of the data traffic flows, to which the QoS flow identifier is added, to the second communication node through the unicast tunnel corresponding to the QoS flow identifier; or
   upon determination that the flow establishment configuration information includes the MBS flow identifier, the corresponding multicast shared tunnel, and the corresponding QoS profile, configuring, in parallel with the multicast shared tunnel, the unicast tunnel as a dummy tunnel in which no user data of the MBS is transmitted, adding a multicast broadcast service (MBS) identity to an encapsulation header of the user data of the data traffic flows, and transmitting, by the first communication node, the user data of the data traffic flows, to which the MBS identity is added, to the second communication node through the multicast shared tunnel.

2. The method of claim 1, wherein the corresponding unicast tunnel includes an existing unicast tunnel or a new unicast tunnel.

3. The method of claim 1, wherein the flow establishment configuration information is included in an existing protocol data unit (PDU) session.

4. The method of claim 3, wherein the corresponding unicast tunnel is an existing unicast tunnel being used by an existing PDU session.

5. The method of claim 3, wherein the corresponding unicast tunnel is a new unicast tunnel being used by a new PDU session.

6. The method of claim 1, wherein the flow establishment configuration information is included in a new protocol data unit (PDU) session.

7. The method of claim 1, wherein the shared tunnel is established by a multicast broadcast session triggered by a multicast broadcast service function (MBSF).

8. The method of claim 1, wherein the first communication node includes a core network, and the second communication node includes a radio access network.

9. A data communication method, comprising:
receiving, by a second communication node, from a first communication node, flow establishment configuration information to transmit data traffic flows for a mobile device, wherein the flow establishment configuration information includes a unicast flow identifier, a corresponding unicast tunnel, and a corresponding quality of service (QOS) profile, wherein the unicast flow identifier includes a quality of service (QOS) flow identifier;
determining, by the second communication node, whether user data of the data traffic flows is received through a unicast tunnel or a multicast tunnel based on the flow establishment configuration information; and
receiving, by the second communication node, the user data of the data traffic flows through the unicast tunnel or the multicast tunnel based on the determination,
wherein the first communication node is configured to determine which transmission mode is to be used between a unicast mode and a multicast mode, wherein the unicast mode is configured to use the unicast tunnel, and the multicast mode is configured to use the multicast tunnel,
wherein, upon determination that the flow establishment configuration information does not include a multicast broadcast service (MBS) flow identifier, a corresponding multicast shared tunnel, and a corresponding multicast quality of service (QOS) profile, the QoS flow identifier is added to an encapsulation header of user data of the data traffic flow, and the unicast tunnel is used to transmit the user data of the data traffic flows, to which the QoS flow identifier is added, from the first communication node to the second communication node, or upon determination that the flow establishment configuration information includes the multicast broadcast service, MBS, flow identifier, the corresponding multicast shared tunnel, and the corresponding multicast quality of service (QOS) profile, the unicast tunnel is configured as a dummy tunnel in which no user data of the MBS is transmitted, in parallel with the multicast shared tunnel, and a multicast broadcast service (MBS) identity is added to an encapsulation header of the user data of the data traffic flows, and the multicast shared tunnel is used to transmit the user data of the data traffic flows, to which the MBS identity is added, from the first communication node to the second communication node.

10. The method of claim 9, wherein the flow establishment configuration information is included in an existing protocol data unit (PDU) session.

11. The method of claim 10, wherein the unicast tunnel is an existing unicast tunnel being used by the existing PDU session.

12. The method of claim 9, wherein the flow establishment configuration information is included in a new protocol data unit (PDU) session.

13. The method of claim 12, wherein the unicast tunnel is a new unicast tunnel being used by the new PDU session.

14. The method of claim 9, wherein the first communication node is configured to determine which transmission mode is to be used between the unicast mode and the multicast mode.

15. The method of claim 14, wherein the unicast mode is configured to use the unicast tunnel, and the multicast mode is configured to use the multicast tunnel.

16. The method of claim 9, wherein the first communication node includes a core network, and the second communication node includes a radio access network.

17. An apparatus for wireless communication, comprising a memory and a processor, wherein the processor reads code from the memory and implements the method recited claim 1.

18. An apparatus for wireless communication, comprising a memory and a processor, wherein the processor reads code from the memory and implements the method recited claim 9.

* * * * *